US009274863B1

(12) United States Patent
Qiu et al.

(10) Patent No.: US 9,274,863 B1
(45) Date of Patent: Mar. 1, 2016

(54) LATENCY REDUCTION IN DISTRIBUTED COMPUTING SYSTEMS

(71) Applicant: Google Inc., Mountain View, CA (US)

(72) Inventors: Tianhao Qiu, Cupertino, CA (US); Manpreet Singh, Santa Clara, CA (US); Haifeng Jiang, Sunnyvale, CA (US); Ashish Gupta, Sunnyvale, CA (US); Sumit Das, Sunnyvale, CA (US); Venkatesh Basker, Mountain View, CA (US); Rajagopal Ananthanarayanan, San Jose, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 14/037,919

(22) Filed: Sep. 26, 2013

Related U.S. Application Data

(60) Provisional application No. 61/803,620, filed on Mar. 20, 2013.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ..................................... *G06F 9/547* (2013.01)

(58) Field of Classification Search
None
See application file for complete search history.

(56) References Cited

U.S. PATENT DOCUMENTS

| 6,167,432 | A | 12/2000 | Jiang |
| 6,477,619 | B1 | 11/2002 | Fujimoto et al. |
| 7,840,547 | B1 | 11/2010 | Tucker et al. |
| 8,370,520 | B2 | 2/2013 | Kohli et al. |
| 8,626,136 | B2 | 1/2014 | Ozzie et al. |
| 2003/0009668 | A1 * | 1/2003 | Chan et al. .................... 713/171 |
| 2003/0204474 | A1 | 10/2003 | Capek et al. |
| 2006/0242017 | A1 | 10/2006 | Libes et al. |
| 2007/0150450 | A1 | 6/2007 | Murase |
| 2011/0040887 | A1 | 2/2011 | Andrade et al. |
| 2011/0173235 | A1 | 7/2011 | Aman et al. |
| 2011/0231241 | A1 | 9/2011 | Kesari et al. |
| 2011/0288928 | A1 | 11/2011 | Patwa et al. |

(Continued)

OTHER PUBLICATIONS

Abadi, Daniel J. et al., "The Design of the Borealis Stream Processing Engine," Proceedings of the 2005 CIDR Conference.

(Continued)

*Primary Examiner* — Craig Dorais
(74) *Attorney, Agent, or Firm* — Lerner, David, Littenberg, Krumholz & Mentlik, LLP

(57) ABSTRACT

Aspects of the disclosure relate generally to reducing latency for consensus in geographically distributed disaster-safe persistent data-store systems. These distributed systems may include registry system having redundant storage for maintaining the system status. Each registry system may include a server and a storage component. Consensus may be achieved by querying all of other servers of the registry system. In one example, the consensus data may be sharded into independent small groups. This may allow for multiple consensus transactions to be generated and run in parallel, which, in turn may reduce the latency. In addition, or alternatively, requests to a server to write or otherwise change the data-store may be batched at the server side. Thus, for the consensus, the server need only communicate with the other servers only once per batch. This may also reduce the latency of the distributed system.

18 Claims, 4 Drawing Sheets

(56) References Cited

U.S. PATENT DOCUMENTS

| | | |
|---|---|---|
| 2012/0010979 A1 | 1/2012 | Ramer et al. |
| 2012/0151253 A1 | 6/2012 | Horn |
| 2012/0191982 A1 | 7/2012 | Levin |
| 2013/0066880 A1 | 3/2013 | Schramm et al. |
| 2013/0159251 A1* | 6/2013 | Skrenta et al. ............ 707/612 |
| 2013/0254280 A1* | 9/2013 | Yang et al. ............... 709/204 |
| 2014/0324816 A1 | 10/2014 | Bennett et al. |

OTHER PUBLICATIONS

Das, Abhinandan et al., "Approximate Join Processing Over Data Streams," SIGMOD (2003) ACM 1-58113-634.

Baker Jason et al., "Megastore: Providing Scalable, Highly Available Storage for Interactive Services," 5th Biennial Conference on Innovative Data Systems Research (2011) Asilomar, California USA.

Codd, E.F. et al., "A Relational Model of Data for Large Shared Data Banks," Communications of the ACM, (1970) 13:6.

Corbett, James C. et al., "Spanner: Google's Globally-Distributed Database," 10th Usenix Symposium on Operating Systems Design and Implementation (2012).

Dean, Jeffrey et al., "MapReduce: Simplified Data Processing on Large Clusters," OSDI Technical Program (2004) pp. 1-13.

Fitzpatrick, Brad, "Distributed Caching with Memcached," Linux Journal (2004) www.linuxjournal.com/node/7451/print.

Gedik, Bugra, et al., "Executing Stream Joins on the Cell Processor," VLDB (2007) ACM 978-1-59593-649, Vienna Austria.

Ghemawat, Sanjay et al., "The Google File System," SOSP (2003) ACM 1-58113-757.

Hammad Moustafa A. et al., "StreamWindow Join: Tracking Moving Objects in Sensor-Network Databases," SSDBM (2003).

Kang, Jaewoo et al., "Evaluating Window Joins over Unbounded Streams," Proceedings of the 28th VLDB Conference, (2002) Hong Kong, China.

Karger, David et al., "Consistent Hashing and Random Trees: Distributed Caching Protocols for Relieving Hot Spots on the World Wide Web," Department of Mathematics, MIT, Cambridge (1997) http://theory.lcs.mit.edu.

Mishra, Priti et al., "Join Processing in Relational Databases," ACM Computing Surveys, (1992) 24:1.

Neumeyer, Leonardo et al., "S4: Distributed Stream Computing Platform," IEEE International Conference on Data Mining Workshops, (2010) 978-0-7695-4257.

Rao, Jun et al., "Using Paxos to Build a Scalable, Consistent, and Highly Available Datastore," VLDB Endowment (2011) 4:4.

Schneider, Fred B., "Implementing Fault-Tolerant Services Using the State Machine Approach: A Tutorial," ACM Computing Surveys, (1990) 22:4.

Chandrasekaran, Sirish et al., "Streaming Queries over Streaming Data," Proceedings of the 28th VLDB Conference, (2002) Hong Kong, China.

Teubner, Jens et al., "How Soccer Players Would do Stream Joins," SIGMOD (2011) Athens, Greece.

What is Amazon DynamoDB?—Amazon DynamoDB (2013) docs.aws.amazon.com/amazondynamodb/latest/developerguide/Introduction.html.

Xie, Junyi et al., "A Survey of Join Processing in Data Streams," (2006).

Chang, Fay et al., "Bigtable: A Distributed Storage System for Structured Data," ACM Transactions on Computer Systems (2008) 26:2 Article 4.

Zaharia, Matei et al., "Discretized Streams: A Fault-Tolerant Model for Scalable Stream Processing," Electrical Engineering and Computer Sciences University of California At Berkeley (2012) http://www.eecs.berkeley.edu/Pubs/TechRpts/2012/EECS-2012-259.html.

Xie, Junyi et al., "A Survey of Join Processing in Data Streams," (2007).

Shasa, Dennis et al., "Database Tuning: Principles, Experiments, and Troubleshooting Techniques," Morgan Kaufmann Publishers (2002) ISBN: 1558607536.

Kang, Jaewoo et al., "Evaluating Window Joins Over Unbounded Streams", University of Wisconsin-Madison, Computer Sciences Department, 2003, 12 pages.

ATG Installation and Configuration Guide, [online], [Retrieved Mar. 7, 2013] Retrieved from the Internet: <http://docs.oracle.com/cd/E23095_01/Platform.93/ATGInstallGuide/html/s08> 1 page.

Leslie Lamport, Paxos Made Simple, Nov. 1, 2001, 14 pages.

Spyros Blanas, Jignesh M. Patel, Vuk Ercegovac, Jun Rao, Eugene J. Shekita and Yuanyuan Tian, A Comparison of Join Algorithms for Log Processing in MapReduce, 12 pages, 2010.

Spyros Blanas, Jignesh M. Patel, Vuk Ercegovac, Jun Rao, Eugene J. Shekita and Yuanyuan Tian, A Comparison of Join Algorithms for Log Processing in MapReduce, Power Point Presentation, 17 pages, 2010.

Tushar Chandra, Robert Griesemer, and Joshua Redstone, Paxos Made Live—An Engineering Perspective, Jun. 26, 2007, 16 pages.

* cited by examiner

LATENCY REDUCTION IN DISTRIBUTED COMPUTING SYSTEMS

CROSS REFERENCE TO RELATED APPLICATIONS

The present application claims the benefit of the filing date of U.S. Provisional Patent Application No. 61/803,620 filed Mar. 20, 2013, the entire disclosure of which is hereby incorporated herein by reference.

BACKGROUND

Building fault-tolerant distributed systems may require saving system state consistently across geographically diverse locations. For example, by providing database replicas of the system state in different geographic locations, such as the East Coast and West Coast of the United States, a failure of one system in a particular geographic region may not affect the entire system.

These distributed systems may require a consistency mechanism to maintain the integrity of the data generated by the system. In one example, these systems may operate using the Paxos algorithm. Paxos is a consensus algorithm which may be executed by a set of servers to enable them to agree on a single value in the presence of failures (consensus). It may guarantee synchronous replication of submitted values among the majority of servers. Paxos may require consensus at every update or write operation. During such consensus, a master server needs to talk to all other peer servers and obtain a majority count from them. Accordingly, the master server initiates roundtrip communications with all peers at every requested operation and will wait for the responses before proceeding. However, by doing so, consensus may have to come from more than one geographical region before a transaction can be committed. This can significantly increase the cost to the network, increase the latency of the system, and reduce throughput (return of success or failure on each requested operation) of the system.

For example, based on typical network statistics, the RTT (round trip time) between different geographical regions, such as East Coast and West Coast of the United States, may frequently go as high as 100 milliseconds. In such an event, this may limit the throughput of such systems to approximately 10 transactions per second, and may be ineffective for any systems which may need to process (both read and write) tens of thousands of events or even millions per second.

One solution in a distributed system is to generate batched transactions. However, in most client-server models, decisions for batching and the responsibility of maintaining consistency within a batch lies with client rather than the server. In this example, the server may simply support a batch of transactions, but the client has to specify all the details of a batch.

SUMMARY

One aspect of the disclosure provides a method. The method includes generating, by a processor of a key registry system, a key registry server shard identifier based on a key, and a number of shards q for the registry system; sending, to a key registry server shard identified by the key registry server shard, a remote procedure call for the key; and receiving confirmation that the remote procedure call was successful.

In one example, the method also includes sending, to the key registry server shard and with the remote procedure call, a token; and receiving conformation that the remote procedure call was rejected. In another example, generating a key registry server identifier further includes comparing a timestamp associated with the key to a time t to determine the number of shards q. In another example, the method also includes generating a second key registry server shard identifier based on a second key and the number of shards q for the registry system. In another example, the method also includes generating a second key registry server shard identifier based on a second key and a second number of shards q2 for the registry system, where q2 is less than q. In another example, the method also includes generating a second key registry server shard identifier based on a second key and a second number of shards q2 for the registry system, where q2 greater than q.

Another aspect of the disclosure provides a method. The method includes receiving, by a key registry server, a series of remote procedure calls, each remote procedure call of the series identifying a corresponding operation and a corresponding key; for each given remote procedure call of the series of remote procedure calls, classifying the given remote procedure call based on the corresponding operation; adding each given remote procedure call of the series of remote procedure calls to one of a plurality of queues based on the classification of the given remote procedure call; submitting the remote procedure calls of a given queue of the plurality of queues as a single batched request for consensus to other key registry servers; and when consensus has been completed, acting on the remote procedure calls based on the consensus.

In one example, the method also includes, before adding the remote procedure calls to the given queue, performing conflict analysis to determine whether the remote procedure call should be added to the queue. In another example, the method also includes, before submitting the given queue, validating the consistency on the remote procedure calls added to the queue to ensure that the remote procedure calls is technically feasible. In another example, the corresponding operations include instructions for interacting with a key registry, and the method further comprises submitting the remote procedure calls of the given queue before a number of remote procedure calls for the given queue becomes greater than a number of remote procedure calls that is supported by the key registry.

A further aspect of the disclosure provides a system. The system includes a plurality of key registry worker computers each having a processor. These processors are configured to generate, a key registry server shard identifier based on a key and a number of shards q for the registry system; send, to a key registry server shard identified by the key registry server shard, a remote procedure call for the key; and receive confirmation that the remote procedure call was successful.

In one example, the system also includes a plurality of sharded key registry servers. In this example, in each sharded key registry server includes a processor configured to receive a series of remote procedure calls, from one of the plurality of worker computers, each remote procedure call of the series identifying a corresponding operation and a corresponding key; for each given remote procedure call of the series of remote procedure calls, classify the given remote procedure call based on the corresponding operation; add each given remote procedure call of the series of remote procedure calls to one of a plurality of queues based on the classification of the given remote procedure call; submit the remote procedure calls of a given queue of the plurality of queues as a single batched request for consensus to other key registry servers; and when consensus has been completed, act on the remote procedure calls based on the consensus.

In another example, each key registry worker computer of the plurality of key registry worker computers is further configured to send, to the key registry server shard and with the remote procedure call, a token and receive conformation that the remote procedure call was rejected. In another example, the processor of each key registry worker computer is further configured to generate a key registry server identifier further by comparing a timestamp associated with the key to a time t to determine the number of shards q. In another example, the processor of each key registry worker computer is further configured to generate a second key registry server shard identifier based on a second key and the number of shards q for the registry system. In another example, the processor of each key registry worker computer is further configured to generate a second key registry server shard identifier based on a second key and a second number of shards q2 for the registry system, where q2 greater than q. In another example, the system also includes a plurality of sharded key registry servers. Each of these sharded key registry server includes a processor configured to receive a series of remote procedure calls, each remote procedure call of the series identifying a corresponding operation and a corresponding key; for each given remote procedure call of the series of remote procedure calls, classify the given remote procedure call based on the corresponding operation; add each given remote procedure call of the series of remote procedure calls to one of a plurality of queues based on the classification of the given remote procedure call; submit the remote procedure calls of a given queue of the plurality of queues as a single batched request for consensus to other key registry servers; and when consensus has been completed, act on the remote procedure calls based on the consensus. In this example, the processor is further configured to, before adding the remote procedure calls to the given queue, perform conflict analysis to determine whether the remote procedure call should be added to the queue. In another example, the processor of each of the sharded key registry servers is further configured to, before submitting the given queue, validating the consistency on the remote procedure calls added to the queue to ensure that the remote procedure calls is technically feasible. In another example, the corresponding operations include instructions for interacting with a key registry, and the processor is further configured to submit the remote procedure calls of the given queue before a number of remote procedure calls for the given queue becomes greater than a number of remote procedure calls that is supported by the key registry.

DETAILED DESCRIPTION

The present disclosure relates to reducing latency for consensus in geographically distributed disaster-safe persistent data-store systems. These distributed systems may include registry system having redundant storage for maintaining the system status. Each registry system may include a server and a storage component. Consensus may be achieved by querying all of other servers of the registry system. In one example, the consensus data may be sharded into independent small groups. This may allow for multiple consensus transactions to be generated and run in parallel, which, in turn may reduce the latency. In addition, or alternatively, requests to a server to write or otherwise change the data-store may be batched at the server side. Thus, for the consensus, the server need only communicate with the other servers only once per batch. This may also reduce the latency of the distributed system.

Figure 1:
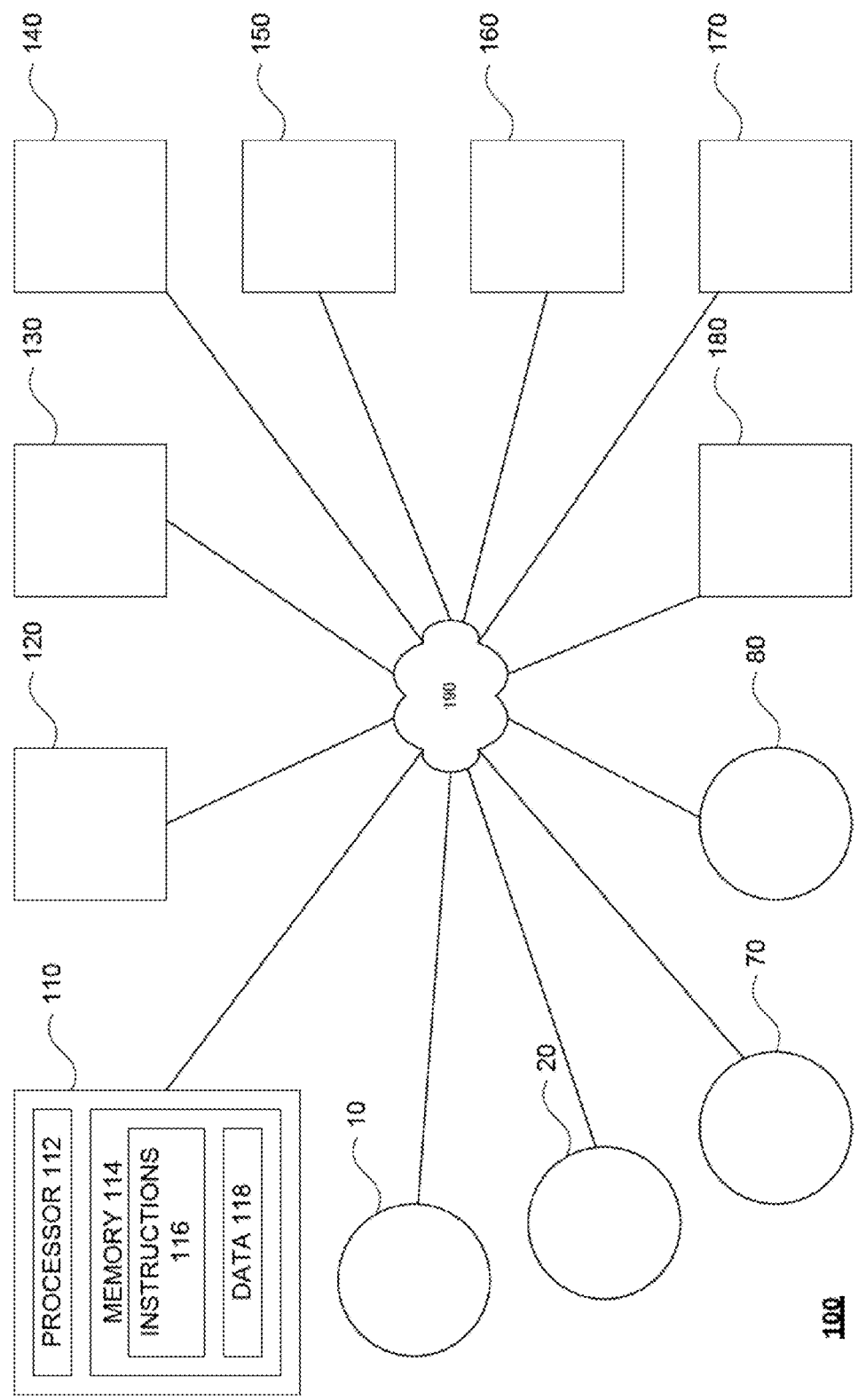
FIG. 1 is a functional diagram of a system in accordance with aspects of the disclosure.
Figure 2:
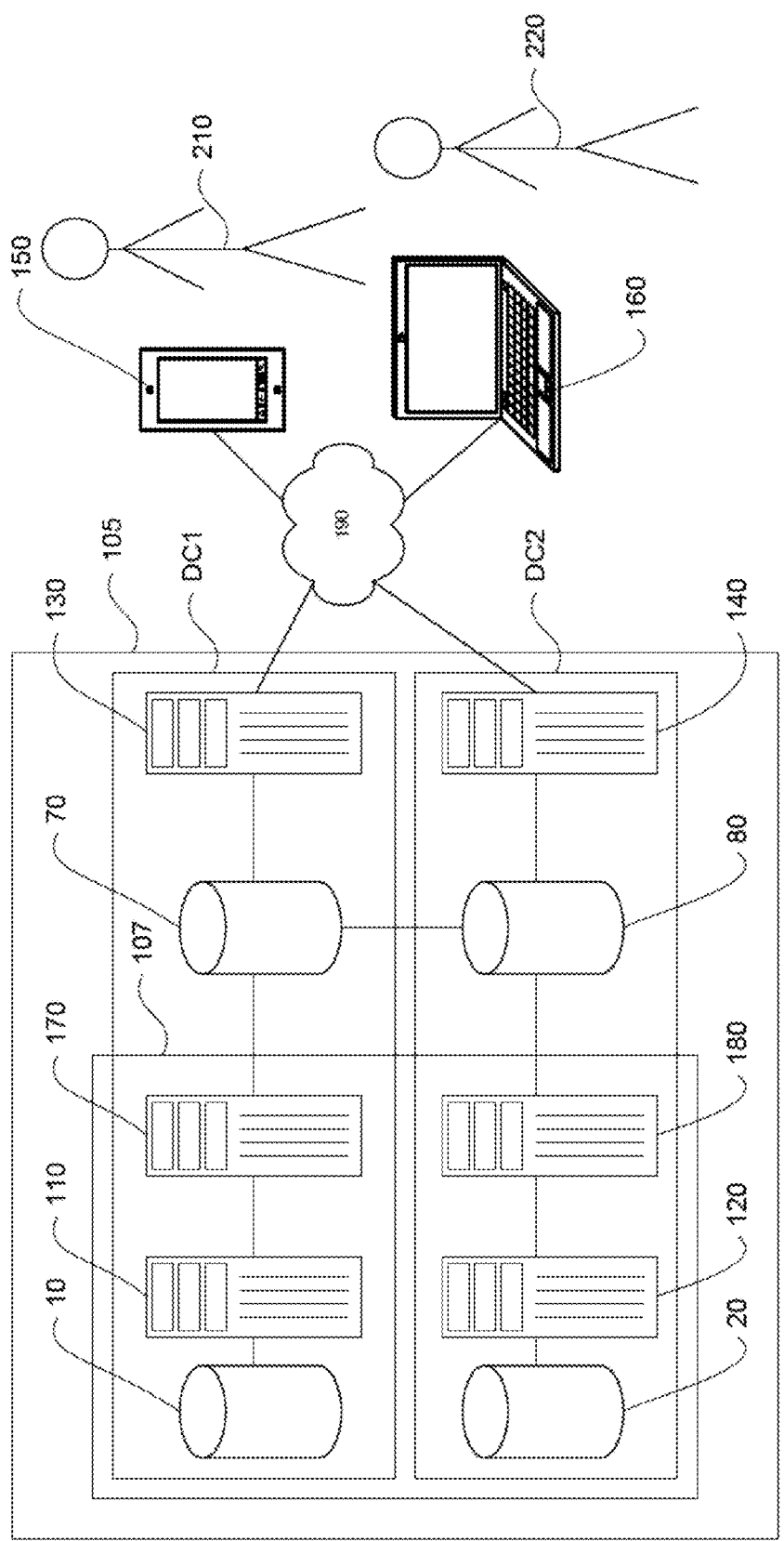
FIG. 2 is a pictorial diagram of the system of FIG. 1.

As shown in FIGS. 1-2, a system 100 is used herein as an example system in which latency reduction features described herein may be implemented. It should not be considered as limiting the scope of the disclosure or usefulness of the features described herein.

In this example, system 100 can include computers 110, 120, 130, 140, 150, 160, 170, and 180 and databases 10, 20, 70, and 80. Computers 110 and 120 can contain a processor 112, memory 114 and other components typically present in general purpose computers. Memory 114 of computer 110 can store information accessible by processor 112, including instructions 116 that can be executed by the processor 112.

Memory can also include data 118 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 112 can be any conventional processor, such as commercially available CPUs. Alternatively, the processor can be a dedicated device such as an ASIC or other hardware-based processor. Although FIG. 1 functionally illustrates the processor, memory, and other elements of computer 110 as being within the same block, the processor, computer, or memory can actually comprise multiple processors, computers, or memories that can or cannot be stored within the same physical housing. For example, memory can be a hard drive or other storage media located in a housing different from that of computer 110. Accordingly, references to a processor, computer, or memory will be understood to include references to a collection of processors, computers, or memories that can or cannot operate in parallel.

The computer 110 can be at one node of a network 190 and capable of directly and indirectly communicating with other nodes, such as computers 130, 150, 160, 170 as well as databases 10 and 70, of the network. Similarly, computer 120 can be at another node of the network and capable of directly and indirectly communicating with other nodes, such as computers 140, 150, 160, and 180 as well as databases 20 and 80. The network 190 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

Each of computers 120, 130, 140, 150, 160, 170, 180 can be configured similarly to the computer 110, with a processor, memory, instructions, and data, similar to processor 112, memory 114, instructions 116, and data 118. As an example, computers 110 and 120 may be key registry servers, computers 170 and 180 may be worker computers, computers 130 and 140 may be web servers, and computers 150 and 160 may be client devices. As such, key registry server 110, worker computer 170, web server 130, and databases 10 and 70 may operate at a first data center DC1 (shown in FIG. 2) at a first geographic location, while key registry server 120, worker computer 180, web server 140, and databases 20 and 80 may operate at a second data center DC2 (shown in FIG. 2) at a second geographic location remote from the first geographic location of the first data center. In this regard, the first and second datacenters may be considered a geographically distributed computing system 105 (shown in FIG. 2). Although not shown, the computing system many more datacenters.

Although FIGS. 1 and 2 depict key registry servers 110 and 120 and worker computers 170 and 180 as singular devices, as described in more detail below (and shown in FIG. 3), these devices may each represent many key registry servers or worker computers. Similarly, web servers 130 and 140 may also comprise many computers, e.g., a load balanced server farm, that exchange information with different nodes of network 190 for the purpose of receiving, processing and transmitting data to the client devices 150 and 160. In this instance, the client devices will typically still be at different nodes of the network than any of the computers of servers 110, 120, 130 or 140 or worker computers 170 or 180.

Each client device 150 and 160 can be a personal computer, intended for use by a user 210 or 220, having all the components normally found in a personal computer such as a central processing unit (CPU), display device, CD-ROM, hard drive, user inputs, speakers, modem and/or network interface device, and all of the components used for connecting these elements to one another. Moreover, client devices in accordance with the systems and methods described herein can comprise any device capable of processing instructions and transmitting data to and from humans and other computers including general purpose personal computers, PDAs, network computers lacking local storage capability, set-top boxes for televisions, wireless-enabled PDA, hand-held or in-car navigation device, tablet PC, netbook, a cellular phone capable of obtaining information using the Internet, and other networked devices.

As described in more detail below, databases 70 and 80 may store logs of key information reported by web servers 130 and 140. Databases 10 and 20 may include logs that are each responsible for storing the global state of system 105. The logs may include key registries identifying key value pairs as described in more detail below. In one example, data from the key registry may be read and written by the key registry servers 110 and 120, respectively. In this regard, databases 10 and 20 along with key registry servers 110 and 120 may comprise a key registry system 107 (shown in FIG. 2). This system may include a number of other databases and key registry servers of other datacenters (not shown in FIG. 1 or 2). In this regard, key registry of the first datacenter may be a master key registry while the key registry of the second datacenter may be a duplicate or peer registry.

Although certain advantages are obtained when information is transmitted or received as noted above, other aspects of the subject matter described herein are not limited to any particular manner of transmission of information. For example, in some aspects, information can be sent using a medium such as a disk, tape or CD-ROM. Yet further, although some functions are indicated as taking place on a single computer having a single processor, various aspects of the subject matter described herein can be implemented by a multiple of computers, for example, communicating information over network 190.

In addition to the operations described below and illustrated in the figures, various operations will now be described. It should also be understood that the following operations do not have to be performed in the precise order described below. Rather, various steps can be handled in a different order or simultaneously. Steps can also be omitted unless otherwise stated.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as web servers 130 or 140.

As an example of the operation aspects of system 100, when a client device, such as client device 150, submits a search query to web server 130, web server 130 may respond to the request by providing information such as a web page and one or more advertisements for display to the user 210. This query may be considered an event. Web server 130 may also generate a key, for example here an event identifier (event ID). In this example, the event ID is a query identifier (query ID) for the query, and web server 130 may also store event information about the advertisements in the logs of database 70. For each advertisement, the event information may include the query ID, an advertiser identifier, auction data for the advertisement, etc.

After receiving the web page and advertisements, user 210 may click on one of the advertisements. The click may also be considered an event. The click event may be sent to web server 130 which may direct the client device to the advertiser's web site. The click event may also be given a key or event ID, here a click identifier (click ID). The click ID may be stored at database 70 with the corresponding query ID as well as other information used to bill the advertiser. Similarly, web server 140 may store event keys, as described with regard to server 130, at database 80.

In this regard, user queries and user clicks may be considered two event streams. Worker computers 170 and 180 may read and pair common keys or query IDs from databases 70 and 80, respectively. The worker computers may then submit remote procedure calls (RPC) requests to key registry servers 110 and 120, respectively. These requests may include a lookup request to check if a key, here event ID, has already been committed to the key registry and a conditional commit request to insert the event ID if, and only if, it is not present. Key registry servers 110 and 120 and the corresponding worker computers 170 and 180 may thus operate in parallel joining events and storing the keys in key registries of databases 70 and 80, respectively.

Although the present disclosure relates to click and query event streams, such systems may be used to join many different types of event streams. For example, some advertisement serving systems may provide advertisements and results as a user is typing a query, by making assumptions about what the user is searching for rather than waiting for a specific search request from the user. Thus, it may be necessary to join the user's actions, such as clicking on an advertisement with the corresponding query for which the system assumed was being searched.

As explained above before committing keys to the key registry system 107, consensus may be required from a majority of key registry databases. As an example, the key registry servers may use the Paxos algorithm to obtain consensus. As noted above, where these databases are geographically remote, the RTT can make consensus efficiently difficult. Although each worker computer may be able to bundle multiple key commits into one RPC request, when there are a large number of worker computers, worker-side batching is not always effective.

Accordingly, the consensus data of a particular key registry system 107 may be sharded into multiple independent Paxos groups. In each key registry system 107 of system 105, events with different event IDs are processed independently of one another. Because of this, the key space handled by a single key registry server may be partitioned into disjoint shards. Thus, keys from separate shards may be managed by separate key registry servers.

Figure 3:
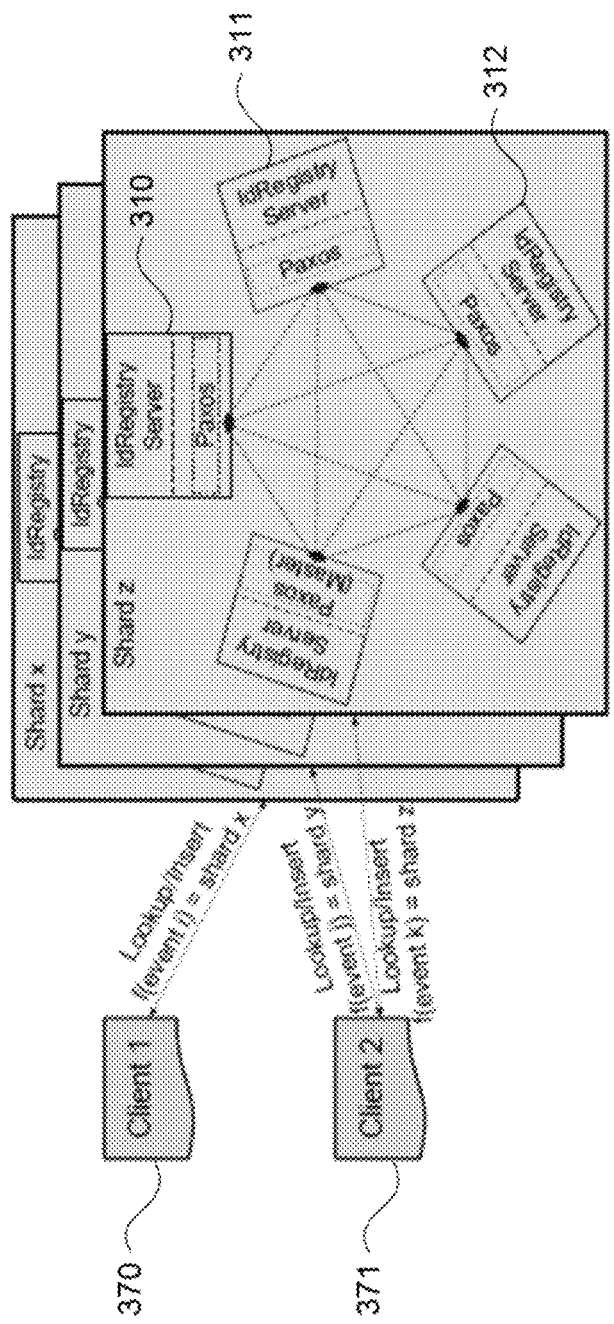
FIG. 3 is an example diagram of a key registry server shard configuration in accordance with aspects of the disclosure.

FIG. 3 is an example of some of the features of the first datacenter. In this example, key registry server 110 shown as a plurality of computers 310-312. Each of these computers may operate as a key registry server. These key registry servers may run in parallel and can accept requests for event IDs deterministically assigned. In addition, FIGURE depicts worker computer 170 as a plurality of worker computers 370-371.

FIG. 3 is also an example in which lookup and insert requests are sent from worker computers 370-371 (referred to as clients in the figure) to different key registry server shards X, Y, and Z, depending on their event ids. The shard number (X, Y, or Z) may be computed as a deterministic hash of the event ID, modulo the total number of shards. For example, if an event ID has a hash value of 8, this will map to shard to as 8 modulo 3 is 2. The hash may include a no-op or identity mapping. Worker computer 371 may still process events for multiple shards, as it can send RPCs to multiple key registry server shards in parallel.

As the state of system 105 may change over time, there may be a need to reshard the consensus data. For example, if there is an increase in the number of events logged at databases 10 and 20, as is expected by the ever-increasing volume of Internet traffic, more shards may be required to increase the number of event IDs that can be confirmed and committed per second.

However, because of the way the shard number is computed for each key (deterministic hash, modulo the total number of shards), simply adding more shards (which results in a change in the denominator when computing the shard number) may result in the same key having a different shard number after the increase in the number of shards. This may lead to duplicating keys in the key registry database. Thus, the sharding mechanism must allow for dynamic changes in the number of shards, which does not move the existing keys across shards.

Each key may have a timestamp associated with it. The clock skew of the timestamp may be bounded by S seconds using a global TrueTime server that provides clock synchronization primitives. By using GPS and atomic clocks, the primitives may guarantee an upper bound on the clock uncertainty. Thus, each web server generating event IDs may execute a background thread that sends an RPC to the TrueTime server every S seconds to synchronize the local clocks.

Once the timestamps are assigned, keys may be sharded based on timestamp (or some function of it). A timestamp-based sharding configuration, which defines the number of shards to use at any given instance of time, may be used. In one example, the current time is t1 and the number of shards is q1. When the number of shards needs to increase or decrease to q2 at time t2, where time t2>t1+S, the system 105 may specify that events with timestamp less than t2 should use hash(key) modulo q1, while the events with timestamp>=t2 should use hash(key) modulo q2. Accordingly, the shard number for a given key may be deterministically computed.

As an example, if the key registry server has 100 shards currently, the sharding configuration may be:
   start time: 0;
   end time: infinity;
   number of shards: 100.
If the number of shards is increased from 100 to 120, and the time for the new number of servers to take effect is 5000, the sharding configuration may change to:
   start time: 0;
   end time: 4999;
   number of shards: 100
   start time: 5000;
   end time: infinity;
   number of shards: 120.
Thus, if there is a key having a timestamp less than 5000, the key may be mapped to one of the 100 shards. If there is a key having a timestamp greater than 5000, the key may be mapped to one of the 120 shards. As noted above, the shard number for each key may be determined using the deterministic hash. Down-sharding, or decreasing the number of shards, may be done in a similar way.

As an alternative, the sharding may be based on some common attribute, other than timestamp, of all the keys, so long as the attribute evenly distributes the load over all the new server shards over time.

During resharding, system 105 must ensure that all key registry servers and worker computers are aware of the sharding configurations. The sharding configuration may be stored at the databases 10 or 20 to ensure that all of the key registry servers are aware of the sharding configurations. To ensure worker computer compliance, the key registry servers may store a token. The key registry servers may require all worker computers to provide the token during each communication. During resharding, the token stored by the key registry servers may be changed. If a worker computer provides an old token, then all its requests to the key registry servers will be rejected. This may reduce the likelihood of processing duplicate events (by mapping the same element to two different shards at different times) caused by bugs in worker computer code.

The aforementioned sharding may provide significant benefits to system 105. For example, it may allow the key registry servers to run multiple consensus (or in the example of system 107, Paxos) transactions in parallel, leading to increased throughput for the application. Thus, the number of key value pairs committed to the key registry system 107 may be significantly increased from 10 transactions per second.

In addition, the sharding may allow the system to garbage collect older keys based on age. For example, since the notion of a time-based varying attribute is present in the key, this property may be used to garbage collect older keys.

The sharding may also reduce the time taken to a snapshot of the state and recover from the state Thus, when a particular server of the system 107 dies and then becomes available again, it can read the current state of the system from the snapshot which is continuously written.

The sharding may be useful for "stateful" applications that need to guarantee exactly-once semantics (for example, a particular key can only be written to the key registry one time), such as the example of system 100 and query and click pairing described above.

While sharding as described above may allow a distributed system to increase the number of committed transactions per second, sharding alone may not be sufficient to efficiently scale to tens of thousands or more transactions per minute. As the number of shards increases, the number of processors (registry servers) required can become enormous very quickly. Accordingly, other latency reduction techniques may also be used.

The latency issues described above may be primarily caused by the inherent topology of system 105, and not necessarily due to the amount of data being sent for each consensus. In fact, each consensus request only needs to send a small amount of event-level data. Thus, another type of latency reduction may include server-side batching of worker computer requests. By doing so, a key registry server may communicate to all other key registry servers only once per batch and further improve throughput of system 105. With such an approach, the key registry server determines the batch, and the worker computer does not need to be aware of the batching.

Returning to the example of the key registry system 107, a single shard of a registry server may receive RPCs from the worker computers. The key registry server shard may classify all allowed RPCs (for example, those with the correct token) into request categories. Such request categories may include lookup requests and write requests. The key registry server shard may maintain separate server-side queues and threads for these request categories.

The key registry server may process the requests in each request category in cycles. These serving cycles may be less than a second. In every serving cycle, a key registry server shard will try to collect or batch as many as requests from those queues and execute the consensus communication to finalize them.

Figure 4:
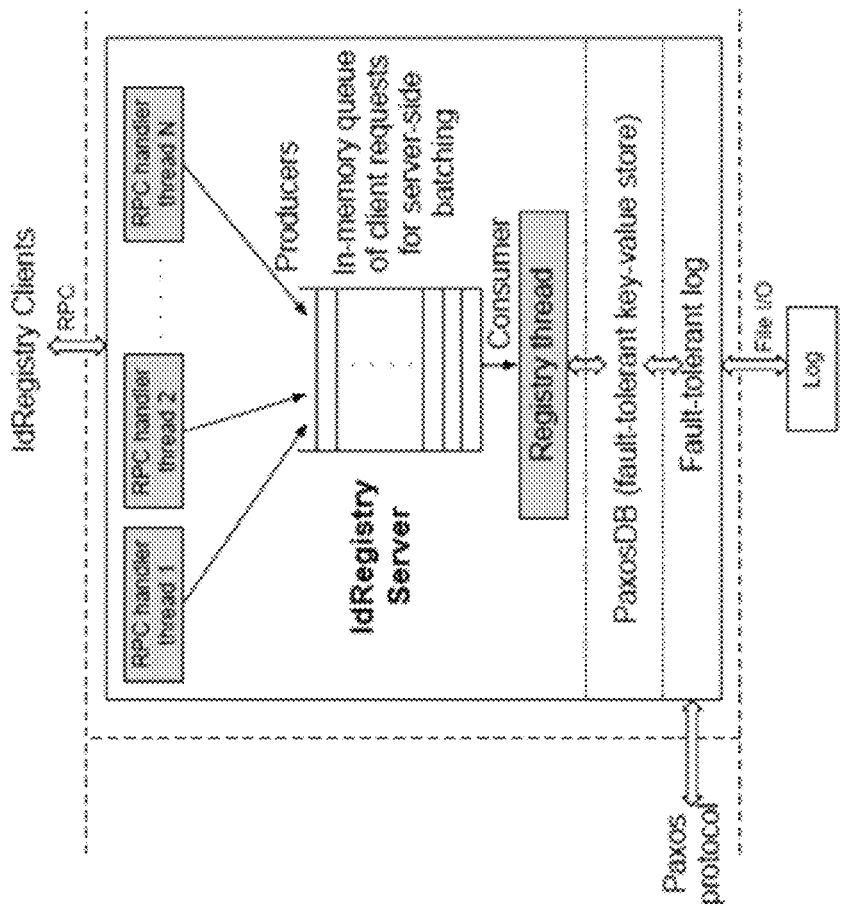
FIG. 4 is an example diagram of a single key registry server shard configuration in accordance with aspects of the disclosure.

FIG. 4 is an example of a single key registry server shard (note, the worker computers may be referred to as clients). As shown in FIG. 4, the key registry server shard has a single background thread (called registry thread) that may dequeue client RPC requests, translates them to consensus (in this example, Paxos) transactions, and sends the RPC response. Instead of dequeuing only a single client (or worker computer) request, the registry thread dequeues N requests and batches them into a single consensus transaction.

When batching individual RPCs into a single operation for the key registries of databases 10 or 20, it has to be atomic to the key registries, specifically, when it supports transactional operations. This means, either all of those RPCs will succeed or none of them. Partial commit may not be a possibility. With that, if a batch fails to commit to the key registry, it may affect the system badly with many RPCs (as many as batch size) failing unnecessarily. Thus, by validating the consistency of the RPCs, the key registry server shards may dramatically reduce the likelihood of such failures.

In one example, a registry thread may perform application-level conflict resolution. If there are multiple client requests trying to insert the same key or event ID into the key registry of database 10 or 20, and the event ID does not already exist, the registry thread will insert the event ID into the key registry or log. The key registry server shard may also provide a confirmation of success to one worker computer (so that it marks the event ID as joined) and send a failure message to the remaining worker computers (so that they can drop the event). This behavior may be implemented using a key registry system that supports multi-row transactions (updating multiple key pairs atomically with condition checks).

In addition, batches may be limited to be transactionally feasible or theoretically satisfiable as a transaction. In this regard, a key registry server shard may validate the consistency of the RPCs in a given thread. A key registry server shard may stop batching RPCs as soon as it encounters a RPC that contradicts with other RPCs already batched in this operation. For example, RPC R1 requests deletion of data keyed on A and creation of another record with key B as a transaction. Another RPC R2 requests deletion of record with key A and creation of record with key C. As these two transactions are conflicting, only one can succeed.

While validating consistency of all the RPCs as a batch, the system 105 can also identify some RPCs that are bound to fail. For the above example, the key registry server shard may know that R2 is bound to fail but only if R1 succeeds. So in this case, the key registry server shard can batch R1 and hold off R2 separately. Once the batch goes through consensus, the key registry server can simply reply failure on R2 to the corresponding worker computer. This may also lead to increased throughput by successfully answer an RPC without even doing any communication to the other key registry servers.

In addition, the system 105 need not enforce a minimum batch size. In this regard, a key registry server need not wait for a particular number of requests to complete a batch; it may batch all the requests pending so far. This may ensure that the key registry servers are not increasing latency of any individual requests by waiting for a batch to be completed. Thus, batching all pending requests may reduce number of packets sent to all other nodes for consensus. This, in turn, may help to reduce the underlying network load, which may further reduce the latency of individual requests as well.

The batch size may thus be limited by other methods. In one example, batches may be limited by hit size, or in other words, the number of RPCs that the underlying database can support as a single operation.

The batching described above may utilize domain-specific optimization. As the key registry shards server serve only a particular domain of event IDs, all the constraints are well known to that server and hence, it may be possible for the key registry server to batch individual worker computer requests into batches.

By batching at the key registry server, the servers may always maintain the order of RPCs received from the worker computers. Accordingly, the key registry servers may not batches out of order, ensuring fairness and avoiding starvation, such as where a request does not get processed by the key registry server for a long time, but newer requests are continuously being processed.

The batching in each key registry server shard may be performed by a single thread for each non-conflicting category in order to increase the likelihood of success for the conflict resolution and validation processes. For example, as lookup requests are always non-conflicting, each shard may have a plurality of lookup threads. Garbage collection may be done lazily, for example not be given priority over operations, and should not be conflicting. So this can be batched separately, however, the number of threads should be chosen so that it would not overload the key registry unnecessarily. For other RPCs, the number of threads would depend on the semantics for that RPC. For example, as write RPCs may be conflicting, only a single write thread may be used for each key registry server shard.

Once consensus is completed, the key registry server can reply to all of the worker computers with the relevant result, for example success or failure, for each RPC. Assuming the size of an RPC for one key or event ID is less than 100 bytes, thousands of RPC requests can be batched into a single consensus transaction. Thus, the key registry servers can share the same round-trip latency among many RPCs and increase throughput multi-fold.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   generating, by one or more processors of a key registry system, a key registry server shard identifier based on a key and a number of shards q for the registry system by comparing a timestamp associated with the key to a time t to determine the number of shards q;
   sending, to a key registry server shard identified by the key registry server shard identifier, a remote procedure call for the key; and
   receiving confirmation that the remote procedure call was successful.

2. The method of claim 1, further comprising:
   sending, to the key registry server shard and with the remote procedure call, a token; and
   receiving conformation that the remote procedure call was rejected.

3. The method of claim 1, further comprising generating a second key registry server shard identifier based on a second key and the number of shards q for the registry system.

4. The method of claim 1, further comprising generating a second key registry server shard identifier based on a second key and a second number of shards q2 for the registry system, where q2 is less than q.

5. The method of claim 1, further comprising generating a second key registry server shard identifier based on a second key and a second number of shards q2 for the registry system, where q2 greater than q.

6. A method comprising:
   receiving, by a key registry server, a series of remote procedure calls, each remote procedure call of the series identifying a corresponding operation and a corresponding key;
   for each given remote procedure call of the series of remote procedure calls, determining, by the key registry server, a classification for the given remote procedure call based on the corresponding operation;
   adding, by the key registry server, each given remote procedure call of the series of remote procedure calls to one of a plurality of queues based on the classification of the given remote procedure call;
   submitting, by the key registry server, the remote procedure calls of a given queue of the plurality of queues as a single batched request for consensus to other key registry servers; and
   when consensus has been completed, acting, by the key registry server, on the remote procedure calls based on the consensus.

7. The method of claim 6, further comprising, before adding the remote procedure calls to the given queue, performing conflict analysis to determine whether the remote procedure call should be added to the queue.

8. The method of claim 6, further comprising, before submitting the given queue, validating the consistency on the remote procedure calls added to the queue to ensure that the remote procedure calls are technically feasible.

9. The method of claim 6, wherein the corresponding operations include instructions for interacting with a key registry, and the method further comprises submitting the remote procedure calls of the given queue before a number of remote procedure calls for the given queue becomes greater than a number of remote procedure calls that is supported by the key registry.

10. A system comprising:
    a plurality of key registry worker computers each having one or more processors configured to:
    generate, a key registry server shard identifier based on a key and a number of shards q for a registry system by comparing a timestamp associated with the key to a time t to determine the number of shards q;
    send, to a key registry server shard identified by the key registry server shard identifier, a remote procedure call for the key; and
    receive confirmation that the remote procedure call was successful.

11. The system of claim 10, further comprising:
    a plurality of sharded key registry servers each having one or more processors configured to:
    receive a series of remote procedure calls, from one of the plurality of worker computers, each remote procedure call of the series identifying a corresponding operation and a corresponding key;
    for each given remote procedure call of the series of remote procedure calls, determine a classification for the given remote procedure call based on the corresponding operation;
    add each given remote procedure call of the series of remote procedure calls to one of a plurality of queues based on the classification of the given remote procedure call;
    submit the remote procedure calls of a given queue of the plurality of queues as a single batched request for consensus to other key registry servers;
    when consensus has been completed, act on the remote procedure calls based on the consensus.

12. The system of claim 10, wherein the one or more processors of each key registry worker computer is further configured to:

send, to the key registry server shard and with the remote procedure call, a token; and receive conformation that the remote procedure call was rejected.

13. The system of claim 10, wherein the one or more processors of each key registry worker computer are further configured to generate a second key registry server shard identifier based on a second key and the number of shards q for the registry system.

14. The system of claim 10, wherein the one or more processors of each key registry worker computer are further configured to generate a second key registry server shard identifier based on a second key and a second number of shards q2 for the registry system, where q2 greater than q.

15. The system of claim 10, further comprising:

a plurality of sharded key registry servers each having one or more processors configured to:

receive a series of remote procedure calls, each remote procedure call of the series identifying a corresponding operation and a corresponding key;

for each given remote procedure call of the series of remote procedure calls, determine a classification for the given remote procedure call based on the corresponding operation;

add each given remote procedure call of the series of remote procedure calls to one of a plurality of queues based on the classification of the given remote procedure call;

submit the remote procedure calls of a given queue of the plurality of queues as a single batched request for consensus to other key registry servers; and when consensus has been completed, act on the remote procedure calls based on the consensus.

16. The system of claim 15, wherein the one or more processors of each sharded key registry server is further configured to, before adding the remote procedure calls to the given queue, perform conflict analysis to determine whether the remote procedure call should be added to the queue.

17. The system of claim 15, wherein the one or more processors of each sharded key registry server is further configured to, before submitting the given queue, validating the consistency on the remote procedure calls added to the queue to ensure that the remote procedure calls is technically feasible.

18. The system of claim 15, wherein the corresponding operations include instructions for interacting with a key registry, and the one or more processors of each sharded key registry server is further configured to submit the remote procedure calls of the given queue before a number of remote procedure calls for the given queue becomes greater than a number of remote procedure calls that is supported by the key registry.

* * * * *